United States Patent [19]
Komuro et al.

[11] Patent Number: 5,675,666
[45] Date of Patent: Oct. 7, 1997

[54] IMAGE DATA COMPRESSION METHOD AND APPARATUS WITH PRE-PROCESSING TO COMPENSATE FOR THE BLOCKY EFFECT

[75] Inventors: Teruyoshi Komuro, Santa Clara; Masao Mizutani; Ching-Fang Chang, both of San Jose, all of Calif.

[73] Assignees: Sony Corportion, Japan; Sony Electronics, Inc., Park Ridge, N.J.

[21] Appl. No.: 399,170

[22] Filed: Mar. 2, 1995

[51] Int. Cl.$^6$ .................. H04N 1/415; H04N 7/12
[52] U.S. Cl. .................. 382/232; 358/430; 358/432; 358/433; 348/409; 348/420
[58] Field of Search .................. 358/426, 433, 358/432, 261.2, 261.3, 430; 382/236, 239, 250, 251, 232; 348/384, 390, 402, 403, 404, 405, 407, 409, 416, 419, 420

[56] References Cited

U.S. PATENT DOCUMENTS

| | | | |
|---|---|---|---|
| 4,727,422 | 2/1988 | Hinman | 348/416 |
| 4,941,043 | 7/1990 | Jass | 348/420 |
| 5,317,397 | 5/1994 | Odaka et al. | 348/416 |
| 5,412,435 | 5/1995 | Nakajima | 348/699 |
| 5,440,345 | 8/1995 | Shimoda | 348/402 |
| 5,450,209 | 9/1995 | Niimura et al. | 358/335 |
| 5,481,553 | 1/1996 | Suzuki et al. | 348/403 |

Primary Examiner—Edward L. Coles, Sr.
Assistant Examiner—Kimberly A. Williams
Attorney, Agent, or Firm—Limbach & Limbach LLP

[57] ABSTRACT

A method and apparatus in which image data are pre-processed before undergoing block-basis image compression to compensate at least partially for the artifact known as the blocky effect that would otherwise be apparent upon decoding of the compressed data. The input data are pre-processed by combining error-correction data therewith, before block-basis compression is performed thereon. Blocky effect errors introduced during block-basis compression (e.g., standard MPEG compression) of the pre-processed input data and subsequent decoding will cancel (at least partially) the error-correction data, thereby compensating (at least partially) for the blocky effect that would otherwise occur without pre-processing. The error-correction data can be generated by performing block-basis compression on input data (performing a discrete cosine or other transform thereon and then quantizing the transformed data); then, performing the inverse transform on the quantized data to generate test data; and then, computing the difference between the input and test data to generate the error-correction data. In preferred embodiments, the apparatus of the invention is a pre-processor which combines error-correction data with input image data to generate pre-processed data for subsequent compression and decoding with reduced blocky effect. In other embodiments, the apparatus also includes a block-basis image compressor including a forward transformer for transforming the pre-processed data, and a quantizer for quantizing the transformed data to generate compressed image data.

17 Claims, 2 Drawing Sheets

IMAGE DATA COMPRESSION METHOD AND APPARATUS WITH PRE-PROCESSING TO COMPENSATE FOR THE BLOCKY EFFECT

FIELD OF THE INVENTION

The invention relates to methods and apparatus for performing image data compression. More particularly, the invention pertains to methods and apparatus for cancelling the "blocky effect" which occurs during image data compression. The expression "blocky effect" is used herein to denote discontinuity across blocks of a displayed decoded image resulting from transformation of image data on a block-by-block basis, followed by quantization (compression) of the transformed data, dequantization (decompression) of the quantized data, and then inverse transformation on a block-by-block basis of the dequantized data and display of the inverse transformed data.

BACKGROUND OF THE INVENTION

Moving images are typically displayed as a sequence of frames of image data, each frame determining an image. Each frame of color image data is typically processed as a stream of pixels, with each pixel consisting of color components (e.g., a red component word, a green component word, and a blue component word). Each frame is typically displayed as two-dimensional array of pixels, which in turn consists of effectively superimposed two-dimensional arrays of color component data (e.g., an array of red component words superimposed with an array of green component words and an array of blue component words).

Each frame of image data can be subdivided into data subsets which we denote as "blocks" of data, each block of data determining a portion of the corresponding image (typically, a compact rectangular subarray of one of the color component arrays of the image). A block of image data is the basic unit of data processed during the discrete cosine transform (DCT) and quantization steps of a class of conventional image compression methods of which MPEG encoding (compression according to the ISO standard known as "MPEG") is an example.

Throughout this specification including in the claims, the expression "block-basis compression" denotes compression in accordance with any of the broad class of compression methods which transform a frame of image data on a block-by-block basis and then quantize the transformed data to produce a quantized (compressed) frame of data which can later be decoded on a block-by-block basis to produce a decoded frame for display (or further processing). The conventional MPEG encoding method is a block-basis compression method.

Throughout this specification including in the claims, the expression "blocky effect" denotes discontinuity across blocks of a decoded frame of image data (especially discontinuity obviously visible to one viewing a displayed image determined by the decoded frame), where the decoded frame has been generated by decoding a compressed frame of data, where the compressed frame is the result of performing "block-basis compression" on a frame of image data.

Typical block-basis compression methods include a transform step which performs a DCT transform on blocks of input data (one block at a time) to generate transformed image data, and then a quantization step which replaces each word of the transformed image data with a quantized word comprising fewer bits (on the average). The quantized (compressed) data, after optional further coding (e.g., further coding to reduce redundancy), are then stored or transmitted. In variations on such compression methods, a discrete sine transform or discrete Fourier transform (rather than a DCT) is performed on each block of input data during the transform step.

After storage or transmission, the compressed data are decoded (and typically further processed, if necessary, to put them in form for display). After an optional initial decoding step (e.g., to reverse the effects of redundancy reduction coding), the compressed data are dequantized (decompressed), and blocks of the dequantized data (one block at a time) undergo the inverse of the transform (e.g., the inverse discrete cosine transform or "IDCT"). Each frame of the inverse-transformed data is a frame of decoded data which can be displayed or further processed.

In a class of embodiments of the invention, each block of data is a set of N×M samples of a frame of monochrome image data. In another class of embodiments of the invention, each block of data is a set of N×M samples of a color component of a frame of color image data. In an example of the latter, a frame of color video data consists of a frame of red color components, a frame of green color components, and a frame of blue color components, and each "block" is an 8×8 set of "red" (or "green" or "blue") color component samples. Each of the sixty-four samples in such set is an 8-bit word determining a red (or green or blue) component of one 24-bit pixel of a color image.

Block-basis compression algorithms process image data in N×M block format rather than in line-scan format. For example, the conventional block-basis image compression algorithms known as the ISO "JPEG" algorithm for still images, the CCITT "H.261" recommendation for video conferencing, and the ISO "MPEG" algorithm for video compression, all process image data in 8×8 block format. Each set of block format data processed by such algorithms is typically a sequence of "minimum coded units." Each minimum coded unit consists of a certain number of blocks for each color component. Since different color components may be sampled with different resolution, the number of blocks per color component in a minimum coded unit can vary with the color component (although the blocks for each color component in a minimum coded unit all correspond to the same area of the image). To implement conventional JPEG, H.261, or MPEG compression, the input data are preferably provided to the image compression means in minimum coded unit-scan format, with each minimum coded unit consisting of data in 8×8 block format (M=N=8). An example of such minimum coded unit-scan format input data is a repeating sequence of an 8×8 block of red words, followed by an 8×8 block of green words, followed by an 8×8 block of blue words.

The MPEG standard for encoding image data is implemented in many of the proposed next generation of digital television (TV) transmission systems. However, MPEG decoded images are subject to so-called "mosquito noise" and to the "blocky effect." Various post-processing (i.e., post-MPEG-decoding) techniques have been proposed for reducing the blocky effect in MPEG decoded images, but they undesirably cause blurring in the final displayed images.

The present invention cancels the blocky effect by implementing a kind of pre-processing on image data, before the image data undergo either compression in accordance with a block-basis compression method (such as MPEG encoding) or decoding.

SUMMARY OF THE INVENTION

The invention is a method and apparatus for performing block-basis compression on image data, in which the image data are pre-processed before undergoing block-basis compression to compensate (at least partially) for the artifact known as the "blocky effect" that would otherwise be apparent upon decoding of the compressed data. The inventors have recognized that the undesirable blocky effect in block-basis compression is caused by quantization of transformed image data, after an initial step of transforming the input data (e.g., by a discrete cosine transform during the MPEG block-basis compression method). The invention "pre-processes" the input data by combining error-correction data with the input data before performing block-basis compression on the pre-processed input data. As a result, errors introduced during block-basis compression of the pre-processed input data and decoding of the compressed data will cancel (at least partially) the error-correction data, thereby compensating (at least partially) for the blocky effect that would otherwise occur without the pre-processing step.

In a class of preferred embodiments, the following steps are performed to generate the error-correction data:

performing block-basis compression on the input data (by performing a DCT or other transform on the input data and then quantizing the transformed data);

then, performing the inverse quantization on the quantized data and performing the inverse transform (e.g., IDCT) on the dequantized data to generate "test" data; and then, computing the difference between the input data and the test data (preferably by subtracting the test data from a delayed version of the input data), thereby generating the error-correction data.

In a class of preferred embodiments, the inventive apparatus is a pre-processor which combines error-correction data with input image data so that the processed data output from the pre-processor can subsequently be compressed and decoded with reduced blocky effect. In another class of preferred embodiments, the inventive apparatus includes the above-described pre-processor and also a block-basis image compression means. The image compression means includes a "forward transform means" for transforming the pre-processed data and a quantization means for quantizing the transformed data to generate compressed image data which can subsequently be compressed and decoded with reduced blocky effect.

DETAILED DESCRIPTION OF THE PREFERRED EMBODIMENTS

Figure 1:
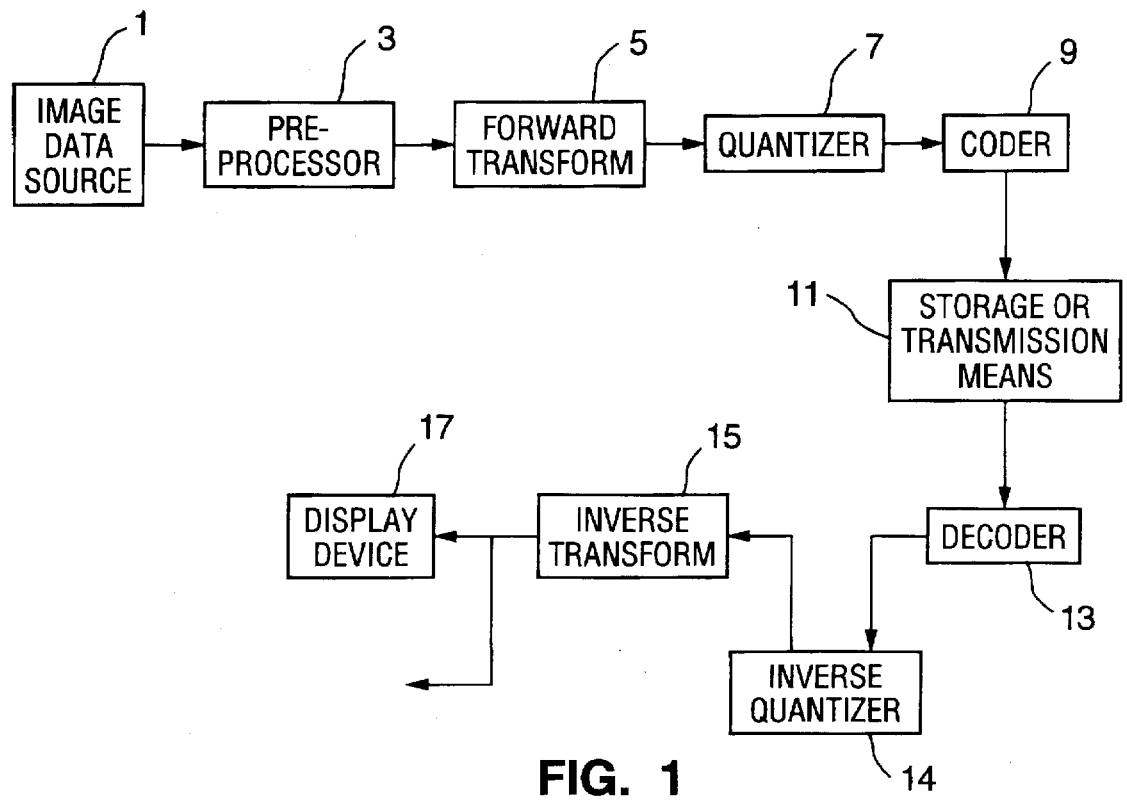
FIG. 1 is a block diagram of a preferred embodiment of the inventive apparatus.

A preferred embodiment of the invention will be described with reference to FIG. 1. In the FIG. 1 apparatus, source 1 supplies a stream of image data to pre-processor 3. The image data are color video data in YUV format, in one preferred implementation. Pre-processor 3 pre-processes the image data before the image data undergo block-basis compression in circuits 5, 7, and 9. The purpose of the pre-processing in element 3 is to compensate (at least partially) for the blocky effect that would otherwise be apparent upon display (on display device 17) of the image data after compression in elements 5, 7, and 9, transmission or storage in element 11, and decoding in elements 13, 14, and 15.

Circuit 5 performs a forward transform on the pre-processed data from pre-processor 3, on a block-by-block basis. This may be a discrete cosine transform (DCT), a discrete Fourier transform, or another suitable invertible transform. In preferred embodiments, circuit 5 performs a DCT on a block-by-block basis on the data it receives (and circuit 15 performs the inverse DCT, or "IDCT," on a block-by-block basis on the data it receives).

Circuit 7 quantizes the transformed data output from circuit 5 to produce quantized (compressed) image data. Coding circuit 9 further encodes the quantized data output from circuit 7 (e.g., to reduce redundancy). The stream of compressed image data output from circuit 9 is then stored or transmitted by storage or transmission means 11. Circuit 9 can be omitted from variations on the FIG. 1 apparatus. In these variations, means 11 stores or transmits the stream of compressed data output from circuit 9. In preferred embodiments, circuits 5 and 7 together perform MPEG encoding (a well-known block-basis compression method) on the image data stream received at the input of circuit 5.

In embodiments in which means 11 is a communication link which transmits the compressed data, means 11 includes a receiver which outputs received, compressed data to decoding circuit 13. In embodiments in which means 11 is a storage device, decoding circuit 13 reads stored compressed data from means 11. In either class of embodiments, decoding circuit 13 performs initial decoding on the compressed data which it receives, for example to reverse the effects of redundancy reduction coding applied by circuit 9.

Circuit 13 can be omitted from variations on the FIG. 1 apparatus (e.g., when circuit 9 is omitted). In these variations, circuit 14 directly receives and processes the stream of compressed data output from means 11.

Inverse quantization circuit 14 receives the initially decoded data output from circuit 13 (or the non-decoded, compressed data output from means 11, if circuit 13 is omitted) and performs inverse quantization thereon to generate dequantized data.

Circuit 15 receives the dequantized data output from circuit 14 and performs thereon the inverse of the transform implemented by circuit 5 (e.g., the inverse discrete cosine transform or "IDCT," in the preferred embodiments in which circuit 5 is a DCT transform circuit). In circuit 15, blocks of dequantized data (one block at a time) undergo the inverse transform. Each frame of the inverse-transformed data output from circuit 15 is a frame of decoded data which can be displayed as an image on display device 17 or further processed.

In some embodiments of the invention, a single computer (digital data processor) programmed in accordance with the invention implements elements 3, 5, 7, and 9 of FIG. 1. In such embodiments, the same (or a different) computer, also appropriately programmed, implements the decoding function of elements 13, 14, and 15 of FIG. 1.

A class of preferred embodiments will next be described with reference to FIG. 2. In the FIG. 2 apparatus, source 1 supplies a stream of image data to pre-processor 23 (which is a preferred embodiment of pre-processor 3 of FIG. 1). Pre-processor 23 pre-processes the image data before the image data undergo block-basis compression (of the type known as MPEG encoding) in MPEG encoder 25. The stream of compressed image data produced at the output of encoder 25 can be stored or transmitted (such as by means 11 of FIG. 1), and then decoded for display.

MPEG encoder 25 includes DCT circuit 35 and quantization circuit 36. DCT circuit 35 performs a discrete cosine transform on the pre-processed data from pre-processor 23, on a block-by-block basis. Quantization circuit 36 quantizes the transformed data output from circuit 35 to produce a stream of MPEG encoded (compressed) image data at its output.

Pre-processor 23 includes first delay circuit 28, second delay circuit 29 connected in parallel with first delay circuit 28, block-basis compression circuitry 30, 31, 31A, 32 connected in parallel with first delay circuit 28, subtraction circuit 33 (connected to subtract the output of circuit 32 from the output of circuit 28), and addition circuit 34 (connected to add the output of circuit 33 to the output of circuit 29).

Block-basis compression circuitry 30, 31, 31A, 32 includes DCT circuit 30 (which is preferably identical to circuit 35) which performs a discrete cosine transform on the image data from source 1, on a block-by-block basis, and outputs transformed image data to quantization circuit 31. Quantization circuit 31 (which is preferably identical to circuit 36) quantizes the transformed data that are output from circuit 30, to produce a stream of MPEG encoded image data which is received by inverse quantization circuit 31A. Circuit 31A performs inverse quantization on the MPEG encoded image data to generate dequantized (decompressed) data. Circuit 32 receives the dequantized data output from circuit 31A, and performs an IDCT (the inverse of the DCT performed by circuit 30) on the dequantized data, on a block-by-block basis. The processed image data (sometimes referred to herein as "test" data) output from circuit 32 are received at one input of subtraction circuit 33. The data that are output from circuit 32 exhibit the blocky effect to be reduced in accordance with the invention.

First delay circuit 28 delays the input data from source 1 by a time corresponding to the processing delay introduced by circuitry 30, 31, 31A, and 32. Subtraction circuit 33 receives the delayed data output from circuit 28, and subtracts therefrom the processed image data asserted at the output of circuit 32. The difference data output from circuit 32 are error-compensation data indicative of the blocky error (and other error) introduced during processing in circuits 30, 31, 31A, and 32 (and thus indicative of error, including blocky error, likely to be introduced to image data from source 1 during block-basis image compression in MPEG encoder 25 and then decoding in an inverse transform circuit similar or identical to circuit 32).

Second delay circuit 29 delays the input data from source 1 by a time corresponding to the processing delay introduced by circuits 30, 31, 31A, 32, and 33. Addition circuit 34 receives the delayed data output from circuit 29, and adds thereto the error-compensation data output from subtraction circuit 33. The pre-processed image data output from circuit 34 are supplied to MPEG encoder 25. The inventors have recognized that the pre-processed image data will exhibit less blocky effect error after processing in MPEG encoder 25 and then decoding in an inverse transform circuit similar (or identical) to circuit 32, than would raw image data from source 1 (if such raw image data were directly processed in MPEG encoder 25 and then decoded in an inverse transform circuit similar or identical to circuit 32).

Figure 2:
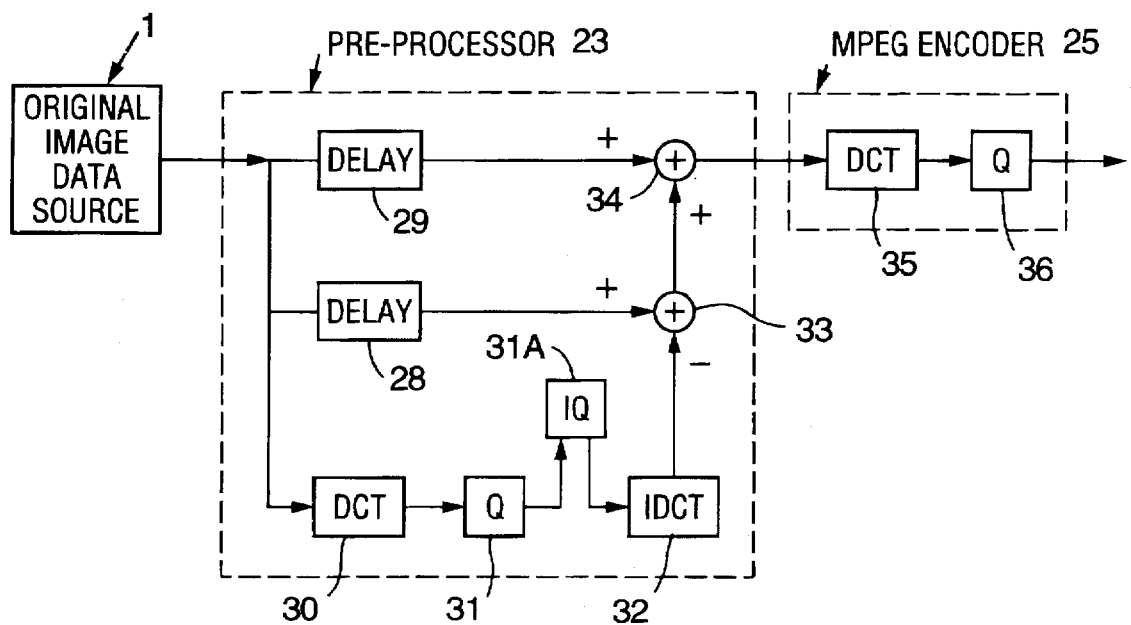
FIG. 2 is a block diagram of another preferred embodiment of the inventive apparatus.

In some variations on pre-processor 23 of FIG. 2, one or both of first delay circuit 28 and second delay circuit 29 are omitted (e.g., where it is not important to compensate for processing delay introduced by circuits 30, 31, 31A, and 32).

In other variations on pre-processor 23 of FIG. 2, subtraction circuit 33 is replaced by a subtracting circuit which generates the inverse of the signal output from circuit 33 (such alternative subtracting circuit subtracts the delayed image data output from circuit 28 from the inverse transformed image data output from circuit 32). In such variations, addition circuit 34 is replaced by a subtracting circuit which subtracts the "inverted" error-compensation data from the delayed data output from circuit 29. Such variations on pre-processor 23 of FIG. 2 will of course output exactly the same data as will pre-pre-processor 23 (in response to the same input data from source 1).

The inventive method includes the steps of:

processing input image data to generate error-correction data indicative of blocky error likely to be introduced to the input image data during block-basis image compression and then decoding by application of an inverse transform; and combining the error-correction data with the input image data (typically, a delayed version of the same input image data that has been processed to generate the error-correction data) to generate pre-processed image data which will exhibit reduced blocky effect error.

Preferred embodiments of the inventive method include the steps of:

performing block-basis compression on input image data (by performing a DCT or other transform on the input data on a block-by-block basis, and then quantizing the transformed data);

then, dequantizing the quantized data and performing the inverse transform (e.g., an IDCT) on the dequantized data to generate test data;

generating error-correction data by subtracting the input data and the test data (e.g., subtracting the test data from a delayed version of the input data, or subtracting a delayed version of the input data from the test data); and combining the error-correction data with the input image data (typically, a delayed version of the same input image data that has been processed to generate the error-correction data) to generate pre-processed image data which will exhibit reduced blocky effect error (after undergoing subsequent block-basis compression and then decoding by application of an inverse transform). The pre-processed image data will exhibit reduced blocky effect error in the sense that after undergoing block-basis compression and then decoding by application of an inverse transform, the pre-processed data will exhibit less blocky error than would the same image data if said image data were to undergo said block-basis compression and decoding by application of an inverse transform without first having been pre-processed in accordance with the invention.

Optionally, the inventive method includes the additional step of performing block-basis compression on pre-processed image data (image data that has been pre-processed in accordance with the invention. Also optionally, the inventive method includes the additional step of performing an inverse transform on compressed pre-processed data.

Next, the invention will be further explained with reference to the image data signals represented in FIGS. 3(a) through 3(e).

Figure 3A:
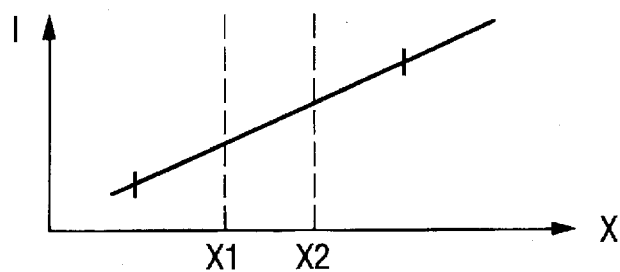
FIG. 3(a) is a graph representing an input image data signal.

FIG. 3(a) is a graph representing an input image data signal. This signal is a "one-dimensional" image data signal in the sense that it is indicative of a sequence of pixels, each pixel determined by an intensity ("I") and an index corresponding to position along the horizontal ("X") axis of FIG. 3(a).

Figure 3B:
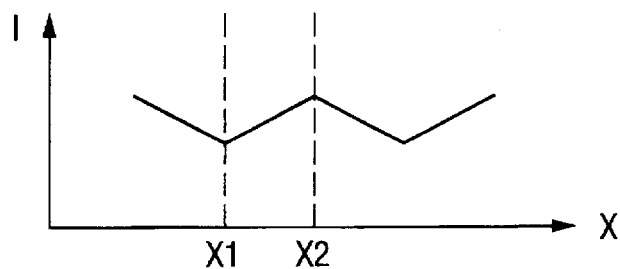
FIG. 3(b) is a graph representing the result of subjecting a segment of the FIG. 3(a) signal (the segment between values X1 and X2) to an ideal DCT/quantization/IDCT process (with an infinite number of quantization levels).

FIG. 3(b) is a graph representing the result of subjecting a segment of the FIG. 3(a) signal (the pixels along the segment between indices X1 and X2) to an ideal block-basis compression and inverse transform process, of the "DCT/quantization/IDCT" type (with an infinite number of quantization levels). The "repeating" portions of the FIG. 3(b) signal outside the index range from X1 to X2 are an artifact of a discrete cosine transform (DCT) followed by an inverse discrete cosine transform (IDCT).

Figure 3C:
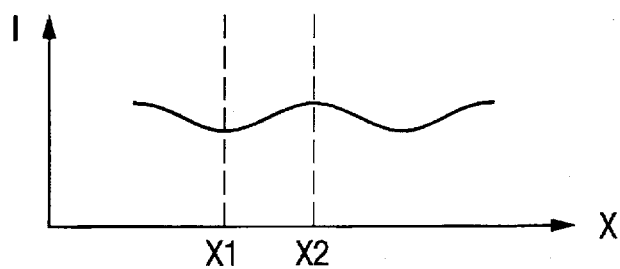
FIG. 3(c) is a graph representing the result of subjecting a segment of the FIG. 3(a) signal (the segment between values X1 and X2) to a DCT/quantization/IDCT process with a finite number of quantization levels.

FIG. 3(c) is a graph representing the result of subjecting the same segment of the FIG. 3(a) signal (the pixels along the segment between indices X1 and X2) to a DCT/quantization/IDCT process with a finite number of quantization levels.

Figure 3D:
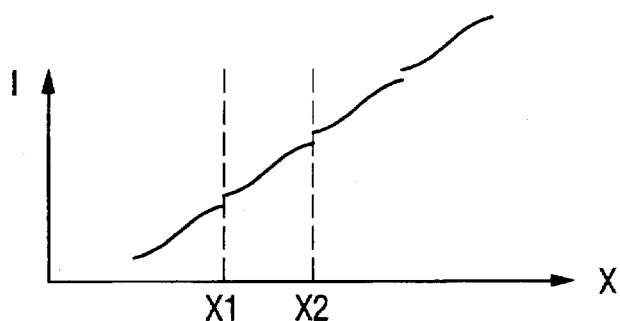
FIG. 3(d) is a graph representing the result of subjecting the entire FIG. 3(a) signal (on a block-by-block basis) to the DCT/quantization/IDCT process applied to generate FIG. 3(c).

FIG. 3(d) is a graph representing the image data signal resulting from subjecting the entire FIG. 3(a) signal (on a block-by-block basis) to the same DCT/quantization/IDCT process applied to generate FIG. 3(c). The FIG. 3(d) exhibits blocky error which is readily apparent from the discontinuities at the boundaries between its adjacent segments (blocks).

Figure 3E:
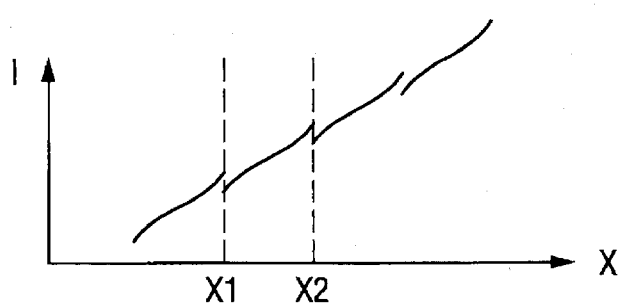
FIG. 3(e) is a graph representing the result of pre-processing the FIG. 3(a) signal in accordance with the invention, to reduce the blocky effect that would result upon subsequent application of a DCT/quantization/IDCT process of the type applied to generate FIG. 3(d).

FIG. 3(e) is a graph representing the result of pre-processing the FIG. 3(a) signal in accordance with the invention (e.g., the FIG. 3(e) signal represents the output of pre-processor 23 of FIG. 2, in the case that the input signal to pre-processor 23 is the image data signal shown in FIG. 3(a). The FIG. 3(e) signal exhibits discontinuities at its blocks. However, the errors causing these discontinuities will be cancelled (at least partially) by subsequent application to the FIG. 3(e) signal of the same DCT/quantization/IDCT process applied to the FIG. (a) signal to generate the FIG. 3(d) signal.

Various modifications and alterations in the described method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for pre-processing image data to compensate for blocky effect error introduction thereto during subsequent block-basis image compression followed by decoding by application of an inverse transform, said method including the steps of:

(a) processing the image data to generate error-compensation data indicative of error likely to be introduced to said image data during said subsequent block-basis image compression and said decoding; and (b) combining the error-compensation data with the image data to generate pre-processed image data which will exhibit reduced blocky effect error after application of said block-basis image compression and then said decoding thereto, wherein step (a) includes the steps of:

(c) generating delayed image data by delaying the image data for a first delay period;

(d) during said first delay period, applying block-basis image compression to said image data to generate compressed data, inverse quantizing the compressed data to generate dequantized data, and then applying said inverse transform to the dequantized data to generate processed data; and (e) generating the error-compensation data by subtracting one of the delayed image data and the processed data from the other of the delayed image data and the processed data.

2. The method of claim 1, wherein step (e) includes the step of subtracting the processed data from the delayed image data to generate the error-compensation data.

3. The method of claim 1, wherein step (b) includes the steps of:

(f) generating further delayed image data by delaying the image data for a second delay period;

(g) after said second delay period, combining the error-compensation data with the further delayed image data to generate said pre-processed image data.

4. The method of claim 3, wherein step (e) includes the step of subtracting the processed data from the delayed image data to generate the error-compensation data, and step (g) includes the step of adding the error-compensation data to the further delayed image data to generate said pre-processed image data.

5. The method of claim 3, wherein step (e) includes the step of subtracting the delayed image data from the processed data to generate the error-compensation data, and step (g) includes the step of subtracting the error-compensation data from the further delayed image data to generate said pre-processed image data.

6. A method for pre-processing image data to compensate for blocky effect error introduction thereto during subsequent block-basis image compression followed by decoding by application of an inverse transform, said method including the steps of:

(a) processing the image data to generate error-compensation data indicative of error likely to be introduced to said image data during said subsequent block-basis image compression and said decoding; and (b) combining the error-compensation data with the image data to generate pre-processed image data which will exhibit reduced blocky effect error after application of said block-basis image compression and then said decoding thereto.

7. The method of claim 6, wherein said block-basis image compression is MPEG encoding.

8. A system for pre-processing image data to compensate for blocky effect error introduction thereto during subsequent block-basis image compression followed by decoding by application of an inverse transform, said system including:

means for processing the image data to generate error-compensation data indicative of error likely to be introduced to said image data during said subsequent block-basis image compression followed by said decoding; and means for combining the error-compensation data with the image data to generate pre-processed image data which will exhibit reduced blocky effect error after application of said block-basis image compression and then said decoding thereto.

9. A system for pre-processing image data to compensate for blocky effect error introduction thereto during subsequent block-basis image compression followed by decoding by application of an inverse transform, said system including:

means for processing the image data to generate error-compensation data indicative of error likely to be introduced to said image data during said subsequent block-basis image compression followed by said decoding; and means for combining the error-compensation data with the image data to generate pre-processed image data which will exhibit reduced blocky effect error after application of said block-basis image compression and then said decoding thereto, wherein the means for processing the image data includes:

means for generating delayed image data by delaying the image data for a first delay period;

compression means for applying, during said first delay period, block-basis image compression to said image data to generate compressed data, then inverse quantizing the compressed data during said first delay period to generate dequantized data, and then applying, during said first delay period, said inverse transform to the dequantized data to generate processed data; and means for generating the error-compensation data by subtracting one of the delayed image data and the processed data from the other of the delayed image data and the processed data.

10. The system of claim 9, wherein said compression means is an MPEG encoding means.

11. A system for pre-processing image data to compensate for blocky effect error introduction thereto during subsequent block-basis image compression followed by decoding by application of an inverse transform, said system including:

means for processing the image data to generate error-compensation data indicative of error likely to be introduced to said image data during said subsequent block-basis image compression followed by said decoding; and means for combining the error-compensation data with the image data to generate pre-processed image data which will exhibit reduced blocky effect error after application of said block-basis image compression and then said decoding thereto, wherein the means for processing the image data includes:

a first delay means for generating delayed image data by delaying the image data for a first delay period;

a block-basis compression means connected in parallel with the first delay means, said block-basis compression means including a transform means which outputs transformed image data in response to said image data, a quantization means which outputs quantized image data in response to said transformed image data, an inverse quantization means which outputs dequantized image data in response to the quantized image data, and an inverse transform means which outputs inverse transformed image data in response to said dequantized image data; and a subtraction means for subtracting one of the delayed image data and the inverse transformed image data from the other of the delayed image data and the inverse transformed image data, thereby generating said error-compensation data.

12. The system of claim 11, wherein the means for means for combining includes:

a second delay means for generating second delayed image data by delaying the image data for a second delay period, said second delay means connected in parallel with the first delay means; and a circuit for combining the error-compensation data with the second delayed image data to generate said pre-processed image data.

13. The system of claim 12, wherein the subtraction means includes means for subtracting the inverse transformed image data from the delayed image data, thereby generating said error-compensation data, and wherein the circuit is an adder which adds the error-compensation data to the second delayed image data to generate said pre-processed image data.

14. The system of claim 11, wherein said compression means is an MPEG encoding means.

15. A system for performing block-basis image compression on image data, said system including:

a pre-processor for pre-processing the image data to generate therefrom pre-processed image data; and a block-basis compression means which receives the pre-processed image data, and applies block-basis compression thereto to generate compressed image data, wherein the compressed image data exhibit less blocky effect error than would be exhibited by directly compressed data resulting from application of the block-basis compression directly to the image data.

16. The system of claim 15, also including:

storage means for storing the compressed image data; and decoding means for receiving stored compressed image data from the storage means and generating data for display by decoding the stored compressed image data.

17. The system of claim 15, also including:

a communication link, including a receiver and means for transmitting the compressed image data to said receiver; and a decoding means connected to the receiver for receiving compressed image data that have been transmitted to the receiver, and generating data for display by decoding said compressed image data.

* * * * *